F. A. PIERCE.
TRAIN LINE VENTING VALVE.
APPLICATION FILED APR. 17, 1909.
983,643.
Patented Feb. 7, 1911.
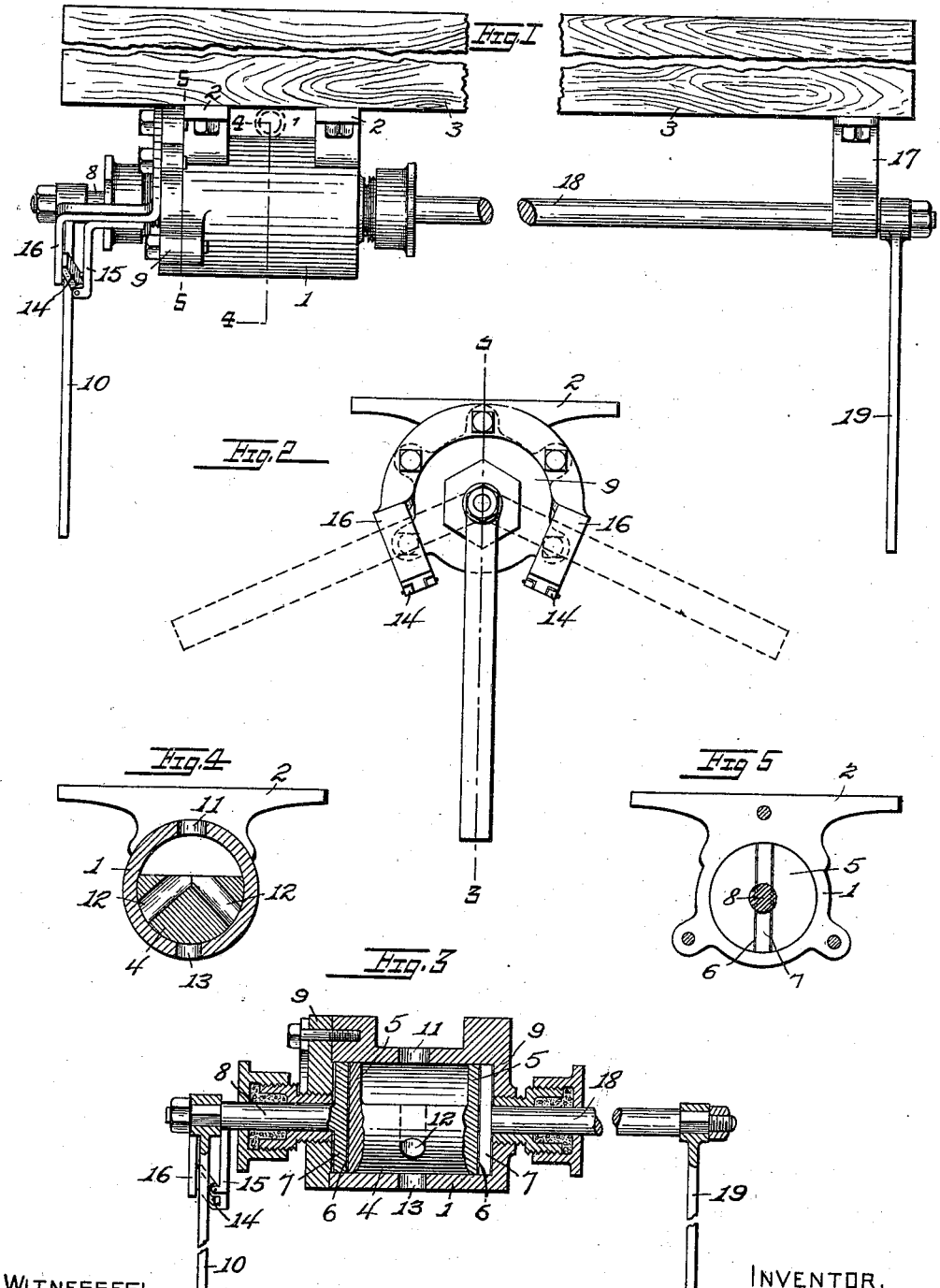
WITNESSES:
INVENTOR,
Franklin A. Pierce
BY
ATTORNEY.

UNITED STATES PATENT OFFICE.

FRANKLIN A. PIERCE, OF WHEELING, WEST VIRGINIA.

TRAIN-LINE-VENTING VALVE.

983,643.  Specification of Letters Patent.  Patented Feb. 7, 1911.

Application filed April 17, 1909. Serial No. 490,520.

*To all whom it may concern:*

Be it known that I, FRANKLIN A. PIERCE, a citizen of the United States of America, and resident of Wheeling, county of Ohio, and State of West Virginia, have invented certain new and useful Improvements in Train-Line-Venting Valves, of which the following is a specification.

This invention relates to improvements in train-line venting-valves, and more particularly to a valve adapted to be mounted upon a locomotive and having communication with the train-line of the air-brake system thereof; and it has for its primary object to provide a valve which is adapted to coöperate or coact for venting the train line and applying the brakes of a train, with the tripping arm of an electrically-controlled tripping device, which latter forms a part of the subject matter of a companion application for patent, Serial Number 490,518, filed simultaneously herewith.

A further object of the invention is to provide a simple, strong, durable and efficient valve of the character mentioned which is not materially effected by wear which normally occupies a seated or closed position preventing the escape of air from the train line, and which may be unseated from either side of the locomotive.

A still further object is to provide, in connection with said valve, means whereby said valve, when forcibly unseated, is automatically locked against independent reseating and the consequent complete exhaustion of air and application of the brakes prevented.

With these and other objects in view, the invention consists in the particular construction, arrangement and combination of parts which will hereinafter be fully described, reference being herein had to the accompanying drawing, forming a part of this specification, in which:—

Figure 1, is a side elevation of the invention, showing it applied to the bumper-beam of a locomotive; Fig. 2, is an outer end view of the same detached; Fig. 3, is a longitudinal sectional view on the line 3—3 of Fig. 2; Fig. 4, is a cross section on the line 4—4 Fig. 1, and Fig. 5, is a similar section on the line 5—5 Fig. 1.

Referring to said drawings, in which like reference numerals designate like parts throughout the several views:—1 indicates a cylindrical casing having means such as integral lugs 2, whereby it may be attached to the bumper-beam 3, or other convenient or appropriate part of a locomotive. Seated within said cylinder is a semi-rotary valve 4, semi-cylindrical in cross section, having circular ends 5, the outer face of each end having a cross groove 6, in which are seated cross heads 7, which are preferably formed integral with stem 8 and shaft 18 which are projected outward horizontally through the cylinder-heads 9. Fixed on the end of said stem 8 is a depending operating lever 10 which is adapted to strike against the trip arm of the tripping mechanism described in the companion application hereinbefore referred to when said arm assumes tripping position. The train-line of the train's air-brake system communicates through a part 11 in the top of the casing 1, with the interior of the latter. The valve 4 has directed therethrough from its upper or flat face two diagonally extending ports 12, which stand at substantially a right angle to each other, one or the other of which, according to the direction of rotary movement of the valve, is adapted to register with an exhaust port 13 provided in the bottom of said casing when said valve is partially rotated, as when the operating lever 10 strikes or engages the trip-arm hereinbefore referred to, for producing an application of the brakes.

For preventing the operating lever 10 from swinging or gravitating back after it has been moved to operative position, and thus cutting off communication between the port 13 and the then registering port 12, automatic locks are provided. Each lock consists of a latch 14 hinged upon an angular strap 15 carried by the cylinder head 9, said latch normally lying in an upwardly inclined position with its point or free end against a second strap 16. When the operating lever 10 is moved in either direction, it rises between said straps 15 and 16 and swings the latch 14 back, against the strap 15. The lever having passed by the latch, the latter drops or gravitates back beneath said lever, effectually preventing the retraction of the latter.

Fixed to the opposite or inner end of the valve and projecting outward through the adjacent end of the casing and thence across to the opposite side of the engine and having its end mounted in an appropriate supporting bracket 17 is the shaft 18 above referred to, which bears upon its end a depending lever 19, similar to the lever 10 and adapted to engage a trip-arm on that side of the track.

As is obvious, the coöperating levers 10, and 19, operate in unison, and consequently when the arm 19 is operated, the arm 10 is locked in the same manner as when it is itself operated. By virtue of the divergent relationship borne between the ports 12, it will be manifest that the train line will be vented regardless of whether the valve be given partial rotary movement forward or rearward, governed by the direction of movement of the train.

What is claimed is:—

1. A train line venting valve comprising in combination with a cylinder having an inlet in its top and an exhaust in its bottom, a valve in said cylinder having an annular head at each end and formed with a portion which connects said heads, which portion is semi-cylindrical in cross section and is formed with a pair of divergently related ports, and means whereby said valve may be operated.

2. A train line venting valve including a cylinder having an inlet and an exhaust, a valve in said cylinder composed of a pair of spaced annular end plates, a connection between said plates which is non-circular in cross section and which has ports extending transversely therethrough, and means to operate the valve.

3. A train line venting valve including a cylinder having an inlet and an exhaust, a valve in the cylinder, said valve having a diametrically extending groove in each end thereof, and rotating means for the valve each including a stem and a cross head secured thereto and extending in said grooves of the valve ends.

4. In combination with a train line venting valve, and means to operate same, a pivotally supported latch member, to be engaged by said valve operating means and raised to allow said operating means to pass same and means to support the free end of the latch member against downward movement to thereby support said operating means.

5. In combination with a train line venting valve and operating means therefor, a gravity operated latch member to be engaged by said means and raised thereby to allow said member to gravitate to a position below said means to thereby support the latter against downward movement.

6. In combination with a train line venting valve and an arm for actuating same, a latch pivoted at one end and having means to engage its free end to restrict the downward movement thereof, said latch being adapted to be engaged by said arm and raised thereby to open position and to drop to normal position after the arm has passed same to thereby support the arm against downward movement.

In testimony whereof I affix my signature in presence of two subscribing witnesses.

FRANKLIN A. PIERCE.

Witnesses:
H. E. DUNLAP,
J. W. SPEIDEL.